(12) United States Patent
Bracco et al.

(10) Patent No.: US 8,679,559 B2
(45) Date of Patent: Mar. 25, 2014

(54) METHOD OF PREPARING AN EDIBLE OIL, CHARACTERIZED BY AN INCREASED SHELF-LIFE, AND EDIBLE OIL OBTAINABLE BY SUCH METHOD

(75) Inventors: Unberto Bracco, Vevey (CH); Giovanni Morchio, Imperia (IT); Mauro Leonardi, Terni (IT); Ivano Mocetti, Bolsena (IT)

(73) Assignee: Costa D'Oro S.p.A., Spoleto (IT)

( * ) Notice: Subject to any disclaimer, the term of this patent is extended or adjusted under 35 U.S.C. 154(b) by 0 days.

(21) Appl. No.: 13/363,385

(22) Filed: Feb. 1, 2012

(65) Prior Publication Data

US 2012/0128840 A1     May 24, 2012

Related U.S. Application Data

(63) Continuation of application No. PCT/IT2009/000158, filed on Apr. 10, 2009.

(51) Int. Cl.
*A23D 9/00*     (2006.01)
(52) U.S. Cl.
USPC .......................................... 426/417; 426/601
(58) Field of Classification Search
USPC ....................................................... 426/417
See application file for complete search history.

(56) References Cited

U.S. PATENT DOCUMENTS

| | | | |
|---|---|---|---|
| 6,162,480 A * | 12/2000 | van Buuren et al. | 426/330.6 |
| 6,942,890 B1 * | 9/2005 | van Buuren et al. | 426/601 |
| 2002/0172751 A1 * | 11/2002 | Husken et al. | 426/605 |

FOREIGN PATENT DOCUMENTS

| | | |
|---|---|---|
| EP | 1221286 | 7/2002 |
| WO | 99/52377 | 10/1999 |
| WO | 00/38541 | 7/2000 |

OTHER PUBLICATIONS

Ozay, G. 1996. Food Research International 28(6)553.*
Panagou, E. 2006. LWT 39:322.*
International Search Report and Written Opinion PCT/IT2009/000158 Jan. 5, 2010.
Esti, Phenolic Compounds in Different Olive Varieties, J. Agric. Fodd Chem. 1998 46 32-35 Jan. 19, 1998.
Poiana, Changes in chemical and microbiological parameters of some varieties of Sicily olives during natural fermentation, Grasa Y Aceites 57 (4) Oct. 2006.
Romani, Polyphenolic Content in Five Tuscany Cultivars of *Olea europaea* L., J. Agric. Food Chem. 47 964-967 Feb. 9, 1999.
Ozay, Effect of brine replacement and salt concentration on the fermentation of naturally black olives, Food Res. Intl. 28-6 pp. 553-559 Jun. 1996.
Panagou, Greek dry-salted olives: Monitoring the dry salting process and subsequent physico-chemical and microbiological profile during storage under different packing conditions at 4 and 20 C, LWT 39 (2006) 322 329 Nov. 29, 2004.

* cited by examiner

*Primary Examiner* — Carolyn Paden
(74) *Attorney, Agent, or Firm* — Henry J. Cittone; Cittone & Chinta LLP

(57) ABSTRACT

Method of preparing an edible oil, characterized by an increased shelf-life, and edible oil obtainable by such method is provided. A method of preparing an edible oil, particularly extra virgin olive oil, is described, including the operation of introducing a predetermined number of olives having a polyphenolic content ranging between 1000-3000 mg of polyphenols/kg of olives in a predetermined volume of oil. In a preferred embodiment, the olives are preventively treated with an anti-mould agent, and are dehydrated, preferably by thermal treatment in an oven at a temperature ranging between 80° C. and 160° C., so as to achieve the elimination of a water amount ranging between 1% and 30%, preferably between 7% and 15%, more preferably of about 10%. The method of the invention allows obtaining an edible oil, particularly extra virgin olive oil, having an increased polyphenolic content, thereby an increased shelf-life, while maintaining the organoleptic characteristics unaltered.

11 Claims, No Drawings

METHOD OF PREPARING AN EDIBLE OIL, CHARACTERIZED BY AN INCREASED SHELF-LIFE, AND EDIBLE OIL OBTAINABLE BY SUCH METHOD

CROSS-REFERENCE TO RELATED APPLICATIONS

This application is a continuation of PCT International Application No. PCT/IT2009/000158, filed Apr. 10, 2009 now WO/2010/116,392, the disclosure of which is incorporated by reference herein in its entirety.

FIELD OF THE INVENTION

The invention relates to a method of preparing an edible oil, particularly extra virgin olive oil, which benefits from an increase of the shelf-life, as well as the edible oil obtainable with the method of the invention.

DESCRIPTION

The method of the invention and the relative product are the result of a study carried out by the Inventors, with the aim of individuating new strategies adapted to improve the stability over time of the extra virgin olive oil—particularly with reference to the oxidation status of the oil—and consequently adapted to increase the product shelf-life.

The above-mentioned object is achieved by a method of preparing an edible oil, particularly extra virgin olive oil, comprising the following steps:

providing a given volume of edible oil, particularly extra virgin olive oil;

inserting a predetermined number of whole olives in the above-mentioned volume of edible oil, the whole olives being characterized by a polyphenolic content ranging between 1000-3000 mg polyphenols, per kg of olives.

It shall be apparent that also the edible oil is within the scope of the invention, particularly the extra virgin olive oil, which exhibits a shelf-life increase obtainable by the method of the invention, the characteristics of which are illustrated in the Examples section in detail.

The above-defined method allows increasing the oil shelf-life, since the polyphenols contained in the olives, which are released over time into the oil volume, act as natural antioxidants.

In a preferred embodiment of the method, the olives introduced into the edible oil belong to the Coratina, Nocellara, and Frantoio cultivars, which are of course characterized by a high polyphenol content.

In a further preferred embodiment, the method provides for the insertion of a number of olives ranging between 1 and 4 per 1 liter oil.

Still more preferably, the olives used in the method of the invention have a so-called 20-22 size, expressed as the number of olives in 100 grams. Such size proved to be particularly suitable to the use in automation technological methods for the insertion of the olives into the oil container, such as, for example, an oil bottle having a neck diameter of about 35 MM.

In a further embodiment, the olives used in the method are green, still not ripe, olives, that is, olives which have not reached the step of full maturity of the fruits, where the epicarp colour shift occurs, from a deep green colouration, which is typical of the still not mature olive, to a final colouration which can vary from purple-red to black, according to the cultivar. The use of still not ripe olives is preferable, since they contain a higher amount of polyphenols relative to mature olives, and therefore they are able to perform their antioxidant function to the best, besides providing an end product characterized by a better visual appearance.

In order to avoid the water release by the olives, due to the phenomenon of osmosis, with consequent clouding of the oil, according to an embodiment of the method, the olives are preventively subjected to a dehydration treatment, so as to achieve the elimination of a water amount ranging between 1 and 30%, preferably between 7% and 15%, still more preferably of about 10%. Such dehydration treatment can be performed in an oven, at a temperature ranging between 80° C. and 160° C., preferably at about 120° C. or, alternatively by the use of a microwave oven, operating at a power ranging between 100 and 400 Watts.

The olives subjected to dehydration according to one of the above-mentioned methods still contain about 30-40% water, which could represent the substrate for a possible growth of microorganisms. Therefore, it can be convenient to subject the olives to a treatment with an anti-mould agent. For example, before the dehydration treatment, the olives can be immersed for a suitable period of time in a 0.3% potassium sorbate aqueous solution, after which they are dried and subjected to the dehydration treatment. By way of example, further anti-mould agents adapted to be employed in the method of the invention are sorbic acid, benzoic acid, p-oxybenzoic acid.

The dehydration of the olives by thermal treatment advantageously allows obtaining a concomitant inactivation of the microflora and the spores which may be still present on the surface of the olives, since the microorganisms' DNA is degraded at a temperature above about 80° C. Therefore, the dehydration by thermal treatment at 80-160° C. is preferred to the microwave oven treatment, since it allows obtaining an additional microbiological stabilization of the end product.

The following examples, given by way of illustrative and non-limitative example, show that the extra virgin and/or olive oil obtained by the method of the invention is an oil characterized by a higher polyphenols content, a lower number of peroxides and of the U.V. spectrophotometric indices, and at the same time organoleptic characteristics which are substantially stable over time and/or with a perceptibly higher sensory rating when analyzed by a Panel.

Example 1

Dehydration of the Olives

In order to avoid the water release by osmotic diffusion by the olives to the extra virgin olive oil, different dehydration methods have been assessed. In Tables 1, 2, and 3, the results obtained by subjecting olives to oven dehydration and microwave oven dehydration are reported. Each sample is composed of 2 olives from each cultivar (Coratina, Nocellara, and Frantoio).

TABLE 1

Oven (stove) tests; temperature: 120° C.

| Test No. | TIME (minutes) | % Water removal |
|---|---|---|
| 1 | 5 | −2.4% |
| 2 | 10 | −6.5% |
| 3 | 15 | −7.6% |
| 4 | 20 | −10.5% slight wrinkling |
| 5 | 25 | −16.2% medium wrinkling |
| 6 | 30 | −21.3% medium wrinkling |
| 7 | 35 | −29.6 medium/strong wrinkling |
| 8 | 40 | −41.4% very dry |
| 9 | 60 | −50.0% completely dry |

TABLE 2

Microwave oven tests at 150 Watts

| Test No. | TIME (minutes) | $1^{st}$ measurement | $2^{nd}$ measurement | $3^{rd}$ measurement |
|---|---|---|---|---|
| 10 | 0.5 | −0.8% | −0.9% | −0.8% |
| 11 | 1 | −1.4% | −1.6% | −1.5% |
| 12 | 1.5 | −2.3% | −2.1% | −2.3% |
| 13 | 2 | −3.7% | −3.5% | −3.6% |
| 14 | 3 | −6.9% | −6.7% | −6.8% |
| 15 | 4 | −8.0% slight wrinkling | −8.2% slight wrinkling | −8.1% slight wrinkling |
| 16 | 5 | −10.0% medium wrinkling | −9.8% medium wrinkling | −10.4% medium wrinkling |

TABLE 3

Microwave oven tests at 300 Watts

| Test No. | TIME (minutes) | $1^{st}$ measurement | $2^{nd}$ measurement | $3^{rd}$ measurement |
|---|---|---|---|---|
| 17 | 0.5 | −2.1% | −1.8% | −2.0% |
| 18 | 1 | −3.0% slight wrinkling | −3.2% slight wrinkling | −3.1% slight wrinkling |
| 19 | 1.5 | −5.6 medium wrinkling | −5.7% medium wrinkling | −5.5% medium wrinkling |
| 20 | 2 | −9.7% strong wrinkling | −10.3% strong wrinkling | −10.0% strong wrinkling |
| 21 | 3 | −21.2% strong wrinkling | −23.0% strong wrinkling | −20.8% strong wrinkling |
| 22 | 4 | −30.5% very dry | −29.7% very dry | −31.2% very dry |
| 23 | 5 | −42.0% completely dry | −39.8% completely dry | −40.5% completely dry |

Example 2

Osmotic Release of Water from Olives to the Oil

On the samples of olives from the dehydration tests, illustrated in Example 1, checks have been carried out, relative to the phenomenon of the osmotic release of water and the relative trend in a period of time of 12 months. The results obtained are summarized in the following Tables 4, 5, and 6.

TABLE 4

Samples from the oven (stove) dehydration tests

| Test No. | t = 1 month | t = 2 months | t = 3 months | t = 4 months | t = 5 months | t = 6 months | t = 7 months | t = 8 months | t = 9 months | t = 10 months | t = 11 months | t = 12 months |
|---|---|---|---|---|---|---|---|---|---|---|---|---|
| 1 | Clear | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy |
| 2 | Clear | Clear | Clear | Slightly cloudy | Slightly cloudy | Slightly cloudy | Slightly cloudy | Slightly cloudy | Slightly cloudy | Slightly cloudy | Slightly cloudy | Slightly cloudy |
| 3 | Clear | Clear | Clear | Clear | Clear | Clear | Clear | Slightly cloudy | Slightly cloudy | Slightly cloudy | Slightly cloudy | Slightly cloudy |
| 4 | Clear | Clear | Clear | Clear | Clear | Clear | Clear | Clear | Clear | Clear | Clear | Clear |
| 5 | Clear | Clear | Clear | Clear | Clear | Clear | Clear | Clear | Clear | Clear | Clear | Clear |
| 6 | Clear | Clear | Clear | Clear | Clear | Clear | Clear | Clear | Clear | Clear | Clear | Clear |
| 7 | Clear | Clear | Clear | Clear | Clear | Clear | Clear | Clear | Clear | Clear | Clear | Clear |
| 8 | Clear | Clear | Clear | Clear | Clear | Clear | Clear | Clear | Clear | Clear | Clear | Clear |
| 9 | Clear | Clear | Clear | Clear | Clear | Clear | Clear | Clear | Clear | Clear | Clear | Clear | t = time

TABLE 5

Samples from the microwave oven dehydration tests at 150 Watts

| Test No. | t = 1 month | t = 2 months | t = 3 months | t = 4 months | t = 5 months | t = 6 months | t = 7 months | t = 8 months | t = 9 months | t = 10 months | t = 11 months | t = 12 months |
|---|---|---|---|---|---|---|---|---|---|---|---|---|
| 10 | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy |
| 11 | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy |
| 12 | Clear | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy | Slightly cloudy |
| 13 | Clear | Clear | Clear | Slightly cloudy | Slightly cloudy | Slightly cloudy | Slightly cloudy | Slightly cloudy | Slightly cloudy | Slightly cloudy | Slightly cloudy | Slightly cloudy |
| 14 | Clear | Clear | Clear | Clear | Clear | Clear | Slightly cloudy | Slightly cloudy | Slightly cloudy | Slightly cloudy | Slightly cloudy | Slightly cloudy |

TABLE 5-continued

Samples from the microwave oven dehydration tests at 150 Watts

| Test No. | t = 1 month | t = 2 months | t = 3 months | t = 4 months | t = 5 months | t = 6 months | t = 7 months | t = 8 months | t = 9 months | t = 10 months | t = 11 months | t = 12 months |
|---|---|---|---|---|---|---|---|---|---|---|---|---|
| 15 | Clear | Clear | Clear | Clear | Clear | Clear | Clear | Clear | Clear | Slightly cloudy | Slightly cloudy | Slightly cloudy |
| 16 | Clear | Clear | Clear | Clear | Clear | Clear | Clear | Clear | Clear | Clear | Clear | Clear | t = time

The samples from the microwave oven dehydration at 300 Watts have a wrinkled appearance already after the elimination of 5.5% water, thus they have not been subjected to check of the osmotic release.

By examining the results obtained from the dehydration tests performed with the two methods (oven or microwave oven), it is pointed out that completely acceptable organoleptic and turgidity characteristics of the fruit are obtained following the elimination of about 10% water. Such dehydration percentage further allows obtaining a finished product in which the phenomenon of osmotic release of water to the oil is completely negligible.

Example 3

Microbiological Analyses

Then, the olives have been subjected to an anti-mould treatment with a solution of 0.3 potassium sorbate in water, then they have been dehydrated by treatment in an oven at 120° C., until eliminating 10% water. The microbiological parameters reported in the following Table 6 have been measured on the olives immersed in extra virgin olive oil and on the preserving oil, at time zero, after 6 months, and after one year from treatment.

TABLE 6

|  | Olives soaked in oil | | | Preserving oil | | |
|---|---|---|---|---|---|---|
|  | time zero | t = 6 months | t = 12 months | time zero | t = 6 months | t = 12 months |
| pH (Max 4.4) | 4.27 | 4.30 | 4.40 | — | — | — |
| Water activity, aw (Max 0.85) | 0.83 | 0.84 | 0.84 | — | — | — |
| Moulds | <1 | <1 | <1 | <1 | <1 | <1 |
| Yeasts | <1 | <1 | <1 | <1 | <1 | <1 |
| Total microbial load (Max 300,000 CFU/g) | <1 | <1 | <1 | <1 | <1 | <1 |
| Sulfite-reducing clostridia | <1 | <1 | <1 | <1 | <1 | <1 |
| Total coliforms | <1 | <1 | <1 | <1 | <1 | <1 |
| Clostridial spores | <1 | <1 | <1 | <1 | <1 | <1 | t = time

From the microbiological analysis reported in Table 6, it is shown that the microbiological stabilization process of the olives is effective, and that there are no risks of contamination of the preserving oil.

Example 4

Check of the Antioxidants Release and Assessment of the Shelf-Life Effect and Organoleptic Characteristics of the Oil On the basis of the results obtained, check tests of the main chemical-physical parameters of the extra virgin olive oil have been performed, in order to assess the efficiency of the method of the invention. As the control, the extra virgin olive oil as it is (T.Q.) has been used, without addition of whole olives. The results are schematically represented in the following Table 7.

TABLE 7

| | OIL T.Q. | Nocellara | Frantoio | Coratina |
|---|---|---|---|---|
| | TIME ZERO | | | |
| Acidity | 0.28 | 0.28 | 0.28 | 0.28 |
| No. of peroxides | 8.5 | 8.5 | 8.5 | 8.5 |
| K 232 | 1.82 | 1.82 | 1.82 | 1.82 |
| K 270 | 0.10 | 0.10 | 0.10 | 0.10 |
| DELTA K | 0.00 | 0.00 | 0.00 | 0.00 |
| Panel Test | Fruity | Fruity | Fruity | Fruity |
| Polyphenols (ppm) | 220 | 220 | 220 | 220 |
| | AFTER 2 MONTHS | | | |
| Acidity | 0.28 | 0.28 | 0.28 | 0.28 |
| No. of peroxides | 9.4 | 9.3 | 9.3 | 9.3 |
| K 232 | 1.89 | 1.88 | 1.89 | 1.87 |
| K 270 | 0.12 | 0.11 | 0.11 | 0.11 |
| DELTA K | 0.00 | 0.00 | 0.00 | 0.00 |
| Panel Test | Fruity | Fruity | Fruity | Fruity |
| Polyphenols (ppm) | 219 | 220 | 222 | 223 |
| | AFTER 4 MONTHS | | | |
| Acidity | 0.29 | 0.28 | 0.29 | 0.28 |
| No. of peroxides | 11 | 10.8 | 10.7 | 10.6 |
| K 232 | 2.03 | 1.97 | 1.98 | 1.96 |
| K 270 | 0.13 | 0.12 | 0.12 | 0.12 |
| DELTA K | 0.00 | 0.00 | 0.00 | 0.00 |
| Panel Test | Fruity | Fruity | Fruity | Fruity |
| Polyphenols (ppm) | 221 | 225 | 226 | 230 |
| | AFTER 6 MONTHS | | | |
| Acidity | 0.30 | 0.29 | 0.29 | 0.28 |
| No. of peroxides | 13.7 | 12.2 | 12 | 11.3 |
| K 232 | 2.10 | 2.05 | 2.05 | 2.03 |
| K 270 | 0.14 | 0.12 | 0.12 | 0.12 |
| DELTA K | 0.00 | 0.00 | 0.00 | 0.00 |
| Panel Test | Fruity | Fruity | Fruity | Fruity |
| Polyphenols (ppm) | 218 | 234 | 232 | 240 |
| | AFTER 8 MONTHS | | | |
| Acidity | 0.30 | 0.30 | 0.30 | 030 |
| No. of peroxides | 15.0 | 12.4 | 12.3 | 11.6 |
| K 232 | 2.22 | 2.10 | 2.11 | 2.09 |
| K 270 | 0.15 | 0.13 | 0.13 | 0.13 |
| DELTA K | 0.00 | 0.00 | 0.00 | 0.00 |
| Panel Test | Fruity | Fruity | Fruity | Fruity |
| Polyphenols (ppm) | 220 | 237 | 238 | 242 |
| | AFTER 10 MONTHS | | | |
| Acidity | 0.31 | 0.30 | 0.30 | 0.30 |
| No. of peroxides | 16.5 | 12.6 | 12.7 | 12.0 |
| K 232 | 2.31 | 2.22 | 2.20 | 2.18 |
| K 270 | 0.17 | 0.14 | 0.14 | 0.14 |
| DELTA K | 0.00 | 0.00 | 0.00 | 0.00 |

TABLE 7-continued

|  | OIL T.Q. | Nocellara | Frantoio | Coratina |
|---|---|---|---|---|
| Panel Test | Fruity | Fruity | Fruity | Fruity |
| Polyphenols (ppm) | 218 | 235 | 240 | 245 |
| AFTER 12 MONTHS | | | | |
| Acidity | 0.32 | 0.31 | 0.31 | 0.31 |
| No. of peroxides | 18.0 | 13.4 | 13.5 | 13.2 |
| K 232 | 2.42 | 2.28 | 2.29 | 2.22 |
| K 270 | 0.21 | 0.17 | 0.18 | 0.15 |
| DELTA K | 0.00 | 0.00 | 0.00 | 0.00 |
| Panel Test | Fruity | Fruity | Fruity | Fruity |
| Polyphenols (ppm) | 219 | 237 | 242 | 249 |

On the basis of the analytical data reported in Table 7 relative to the shelf-life trend for the period of time corresponding to 1 year, it is possible to make the following remarks:

(i) Addition of one preventively treated and stabilized olive does not alter the organoleptic characteristics of the extra virgin olive oil treated with the method of the invention compared to the as it is (T.Q.) oil, on the contrary, the features of the product result to be significantly enhanced.

(ii) Addition of one olive, once the period of time of one year with the extra virgin oil has elapsed, seems to concur to a better preservation of the same, compared to the as it is oil. From what has been set forth above, the extra virgin olive oil exhibits better characteristics, both analytical and organoleptic.

(iii) From the analysis of the polyphenols, it can be found that the olive added to the bottled extra virgin oil causes a perceptible increase of the polyphenolic content compared to the control sample: such increase is of the order of some mgs/kgs. This is to be considered as related to the hydrolysis of the glycosylated form of oleuropeine, which gives origin to significant amounts of tyrosol and hydroxytyrosol, which, as known, are among the most powerful and active natural antioxidants presents in the olive, and which, during milling, in the malaxation and then centrifugation steps are removed mainly along with the vegetation water, and only a small portion is conveyed to the extra virgin oil, as a function of the content present in the initial olives. In view of what has been indicated, the cultivar which exhibits this release most strongly is Coratina, since it exhibits the higher polyphenolic content.

From the results obtained, it can be concluded that the method confers extremely advantageous characteristics to the final product of edible oil, preferably extra virgin olive oil, particularly a higher content of polyphenols which, by acting as natural antioxidants, increase the product shelf-life, without altering the organoleptic characteristics thereof, or better still, objectively improving them in a significant manner, as defined by the Panel examination.

Example 5

Method for Industrial-Scale Preparation

The process finalized in the Costa D'Oro S.p.A. laboratory has been reported on industrial scale, by operating as follows.

The olives of the Coratina cultivar, just harvested, are soaked in a bath for 12 hours, and then washed for ⅔ hours in running water. Then, such olives are soaked in a bath of anti-mould solution (0.3% potassium sorbate in water) for additional 3 hours, then withdrawn, drained and dried on food-grade blotting paper. Immediately after, the olives are put into a oven at 120° C. for 20 minutes in order to both inactivate the microbiological growth and to eliminate about 10% water. Without interruption, the olives are put under sterilizing U.V. lamp, then immersed in extra virgin olive oil in suitable food-grade 25 Kg containers which are sealed with relative plug. The olives are then put into oil bottles with a neck diameter, for example, of 35 mm, in an automatic manner, on the production line, according to the filling rate of the bottling machine, while preserving the fruit integrity, by the use of a suitable dosing machine.

The invention claimed is:

1. A method of preparing an edible oil product, particularly extra virgin olive oil, comprising the following steps:
providing a given volume of edible oil, particularly extra virgin olive oil;
inserting a predetermined number of whole olives in the above-mentioned volume of edible oil, the whole olives having a polyphenolic content ranging between 1000-3000 mg of polyphenols, per kg of olives, characterized in that the whole olives, before being introduced in the edible oil, are subjected to a treatment with an anti-mold agent, after which they are subjected to a dehydration treatment so as to achieve the elimination of a water amount ranging between 1 and 30%.

2. The method according to claim 1, wherein the edible oil product is extra virgin olive oil.

3. The method according to claim 2, wherein the anti-mould agent is selected from the group consisting of potassium sorbate, sorbic acid, benzoic acid, p-oxybenzoic acid.

4. The method according to claim 3, wherein the anti-mould agent is potassium sorbate.

5. The method according to claim 1, wherein the olives, before being introduced in the volume of edible oil, are subjected to a dehydration treatment such as to achieve the elimination of a water amount ranging between 7% and 15%.

6. The method according to claim 5, wherein the olives, before being introduced in the volume of edible oil, are subjected to a dehydration treatment such as to achieve the elimination of a water amount of about 10%.

7. The method according to claim 1, wherein the dehydration treatment is performed by heating in an oven, at a temperature ranging between 80° C. and 160° C., or by treatment in a microwave oven, at a power ranging between 100 and 400 Watts.

8. The method according to claim 1, wherein the dehydration treatment is carried out after the anti-mould treatment, and before putting the olives into a bottle.

9. The method according to claim 1, wherein the above-mentioned predetermined number of olives ranges between 1 and 4 per 1 litre of oil.

10. The method of claim 1 wherein the edible oil product has an increased polyphenolic content.

11. The method of claim 1 wherein the edible oil product is packaged in bottles.

* * * * *